United States Patent
McAuley

(10) Patent No.: US 6,826,744 B1
(45) Date of Patent: Nov. 30, 2004

(54) SYSTEM AND METHOD FOR GENERATING WEB SITES IN AN ARBITRARY OBJECT FRAMEWORK

(75) Inventor: Aubrey McAuley, Austin, TX (US)

(73) Assignee: Vertical Computer Systems, Inc., Austin, TX (US)

( * ) Notice: Subject to any disclaimer, the term of this patent is extended or adjusted under 35 U.S.C. 154(b) by 0 days.

(21) Appl. No.: 09/410,334

(22) Filed: Oct. 1, 1999

(51) Int. Cl.[7] ............................................. G06F 9/45
(52) U.S. Cl. .................................................... 717/108
(58) Field of Search ................. 717/108; 707/103 R; 715/522

(56) References Cited

U.S. PATENT DOCUMENTS

| | | | | |
|---|---|---|---|---|
| 5,544,302 A | * | 8/1996 | Nguyen ..................... 345/837 |
| 5,555,365 A | * | 9/1996 | Selby et al. ................ 345/765 |
| 5,894,554 A | | 4/1999 | Lowery et al. .......... 707/104.1 |
| 5,903,894 A | * | 5/1999 | Reneris ..................... 707/100 |
| 5,930,512 A | * | 7/1999 | Boden et al. ............... 717/102 |
| 5,956,736 A | * | 9/1999 | Hanson et al. ............. 345/760 |
| 6,026,433 A | * | 2/2000 | D'Arlach et al. ............ 707/10 |
| 6,028,998 A | * | 2/2000 | Gloudeman et al. ........ 717/108 |
| 6,052,670 A | * | 4/2000 | Johnson ....................... 705/27 |
| 6,199,082 B1 | * | 3/2001 | Ferrel et al. ................ 715/522 |
| 6,219,680 B1 | * | 4/2001 | Bernardo et al. ......... 707/501.1 |
| 6,226,648 B1 | * | 5/2001 | Appleman et al. .......... 707/102 |
| 6,247,032 B1 | * | 6/2001 | Bernardo et al. ........... 345/733 |
| 6,253,282 B1 | * | 6/2001 | Gish .......................... 709/203 |
| 6,308,188 B1 | * | 10/2001 | Bernardo et al. ........ 707/501.1 |

OTHER PUBLICATIONS

Lewandowski, Framework for Component–Based Client/Server Computing, Mar. 1998, ACM, pp. 3–27.*

* cited by examiner

*Primary Examiner*—John Chavis
(74) *Attorney, Agent, or Firm*—Brown Raysman Millstein Felder & Steiner LLP

(57) ABSTRACT

A system and method for generating computer applications in an arbitrary object framework. The method separates content, form, and function of the computer application so that each may be accessed or modified separately. The method includes creating arbitrary objects, managing the arbitrary objects throughout their life cycle in an object library, and deploying the arbitrary objects in a design framework for use in complex computer applications.

53 Claims, 2 Drawing Sheets

SYSTEM AND METHOD FOR GENERATING WEB SITES IN AN ARBITRARY OBJECT FRAMEWORK

TECHNICAL FIELD OF THE INVENTION

This invention relates generally to systems and methods for generating software applications in an arbitrary object framework, and more specifically to systems and methods for generating web sites in an arbitrary object framework.

BACKGROUND OF THE INVENTION

Three processes used to create complex software applications such as web sites are form, function, and content. Form includes graphic designs, user interfaces, and graphical representations created by a designer or a group of designers. Function includes logical functionality, which can be software code created by a programmer or group of programmers. Form includes informative content. Informative content can include written, recorded, or illustrated documentation, such as photographs, illustrations, product marketing material, and news articles. Content can be created by writers, photographers, artists, reporters, or editors.

Currently, typical workflows dictate a serial approach to integrating the form, function, and content to create complex software applications such as a web site. The serial approach is illustrated in FIG. 1. In FIG. 1, content 10 for a complex software application can be chosen or created. Form 12 for the presentation of content 10 can then be created. Functionality 14 can then be generated using code to create the complex software application (product 16) with the desired information (content 10) and style (form 12). Using the method illustrated in FIG. 1, every final component of the complex software application must be manipulated by a programmer before it is ready to be used. The exact workflow may vary from industry to industry or business to business, but the basic restrictions are generally the same.

A traditional approach such as that illustrated in FIG. 1, may create unwanted bottlenecks in the production process. Each upstream revision, such as a change of content 10 or design 12, forces a repetition of the entire process. As an example, consider a web site for a large newspaper. The web site may have a function that can include a file into the web site. The marketing department may decide to change the appearance of the header on the web site depending on the browser of a user. In this case, a programmer may need to invoke an external script or embed some specific logic within the web site. Unfortunately, if there is a large web site with thousands of pages of information stored on a server, the programmer may have to change every one of the thousands of pages. Therefore, a small change by the marketing department can cause a large burden on the programming department.

Prior art solutions have succeeded in partially separating some of these functions. Notably, content management databases and digital repositories provide a means of separating content from form and function. Likewise, sophisticated software development teams frequently employ internal code structuring techniques that can help to minimize dependencies between interface designs and the functions they access. However, content management tools typically fail to address form/function issues. Therefore, there can still be production slow-downs due to changes in form that require a subsequent change in functionality.

SUMMARY OF THE INVENTION

Therefore a need exists for a method of generating complex software applications that reduces or eliminates production delays and the workload for programmers due to changes in content and/or form. This method should separate form, content and function so that each area can be independently changed.

The present invention provides a system and method for generating software applications that substantially eliminates or reduces disadvantages and problems associated with previously developed systems and methods used for generation of software applications. More specifically, the present invention provides a method for generating software applications in an arbitrary object framework. The method of the present invention separates content, form, and function of the computer application so that each may be accessed or modified independently. The method of this invention includes creating arbitrary objects, managing the arbitrary objects throughout their life cycle, and deploying the arbitrary objects in a design framework for use in complex computer applications.

The present invention provides an important technical advantage in that content, form, and function are separated from each other in the generation of the software application. Therefore, changes in design or content do not require the intervention of a programmer. This advantage decreases the time needed to change various aspects of the software application. Consequently, cost is reduced and versatility is increased.

The present invention provides another technical advantage in that users are not required to use a proprietary language to encode. These arbitrary objects may include encapsulated legacy data, legacy systems and custom programming logic from essentially any source in which they may reside. Any language supported by the host system, or any language that can be interfaced to by the host system, can be used to generate an object within the application.

The present invention provides yet another technical advantage in that it can provide a single point of administrative authority that can reduce security risks. For instance, a large team of programmers can work on developing a large group of arbitrary objects within the object library. If one object has a security hole, an administrator can enter the object library and disable that arbitrary object.

Still another technical advantage of the present invention is that it enables syndication of the software application. As noted above, functionality is separate from form and content. Consequently, a user can easily introduce a new look for the application or syndicate the content and functionality of the application to another group without having to recode all of the objects needed to access content.

Another technical advantage of the present invention is that it allows for personalization and profiling. With personalization, the web presentation is tailored to the specific needs of the web user based on the user's past history. Profiling also enables tailoring a web site or presentation. Profiling is dependent on environmental variables such as browser type or IP address.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Preferred embodiments of the present invention are illustrated in the FIGUREs, like numerals being used to refer to like and corresponding parts of various drawings.

The present invention provides a system and method for using a hierarchical, arbitrary object framework for generating software applications. The method separates content, form, and function of the software application so that each can be accessed or modified independently. The method of this invention includes creating arbitrary objects, managing the arbitrary objects in an object library, and deploying the arbitrary objects in a design framework for use in computer applications.

Figure 1:
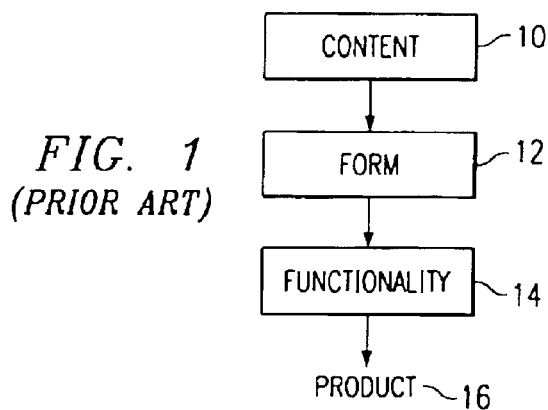
FIG. 1 illustrates a prior art workflow diagram for generating a software product.
Figure 2:
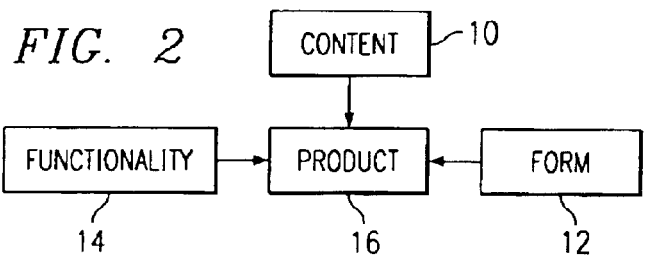
FIG. 2 is a hierarchical workflow diagram for one embodiment of the present invention.

FIG. 2 is a hierarchical workflow diagram for the present invention. Product 6 includes three contributing groups: content 10, form 12, and functionality 14. Content 10 can include written, recorded, or illustrated collateral such as documentation, photographic illustrations, product marketing material, and articles. Form 12 can include graphic designs such as user interfaces and graphical presentations. Function 14 can include the logical functionality of software code and scripts. The hierarchical framework separates content 10, form 12, and functionality 14 to generate product 16. Product 16 may be a computer software application such as a web site. Since content 10, design 12, and functionality 14 are separate entities independent of each other, modification in one group does not require corresponding modifications in another group. Each group can contribute to product 16 directly.

Figure 3:
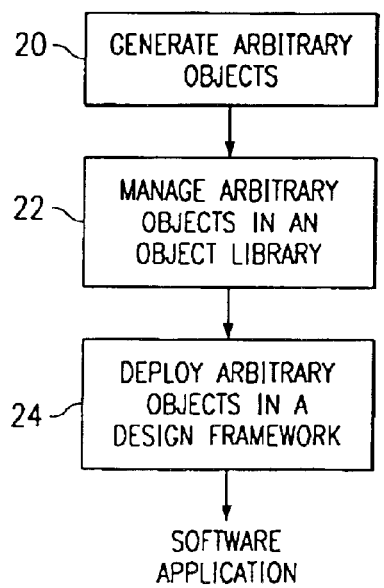
FIG. 3 is a flow diagram for one embodiment of the present invention.

FIG. 3 is a flow diagram of one embodiment of the present invention. At step 20, arbitrary objects can be generated. Arbitrary objects may include any combination of application logic and data desired by a developer. Arbitrary objects can include text file pointers, binary file pointers, compiled executables, scripts, data base queries, shell commands, remote procedure calls, global variables, and local variables. The arbitrary object framework allows arbitrary objects to be referenced in a consistent manner regardless of the type. Also, the arbitrary object framework allows local arbitrary objects to either override global parent arbitrary objects or inherit capabilities and data from the global parent, regardless of the type of the local arbitrary object.

At step 22, these arbitrary objects can be managed in an object library. The life cycle of these objects may be managed in a consistent manner using revision tracking, roll back, and sign off. At step 24, objects can be deployed from the object library into a design framework to create the software application. Because the object pointers are not tied in any way to the functionality of the object, an object of one type can be easily replaced with another object of another type. This eliminates a common problem in content management systems of the inability to preview content within its appropriate location on the site or within the system. Normally, a special system made for the purpose of previewing a piece of content would have to be hard-coded to view the current approved live content for all other pieces except the piece in question. This multiplies the design problem, because changes in the design in the main site change all previous templates. In the method of the present invention, since all that exists within the framework is an arbitrary object, the arbitrary object can be swapped for another object that pulls the current piece content in question.

Using one embodiment of this invention, for example, the Features or Editorials page of a newspaper can be dynamically replaced. The present invention can execute all the normal objects that can be placed on the page to show the content as it would appear, and then take the one piece in question and replace it with a second object to be examined. Objects may be deployed globally across an entire system or locally within a specific area or sub-areas of a system.

Figure 4:
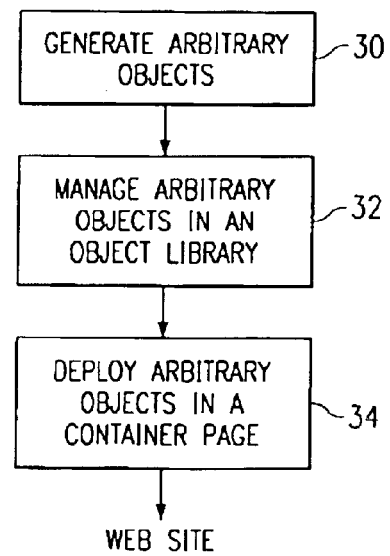
FIG. 4 is a flow diagram for the embodiment illustrated in FIG. 4.

FIG. 4 represents a flow diagram of another embodiment of the present invention. At step 30, arbitrary objects can be generated. At step 32, the arbitrary objects can be managed in an object library. Arbitrary objects can be deployed in a container page at step 34 to generate a web site.

Arbitrary objects may include any combination of application logic and data desired by a developer. Arbitrary objects can include text file pointers, binary file pointers, compiled executable scripts, database queries, shell commands, remote call procedures, global variables and local variables. Arbitrary objects may also include cached data queries and executables. The arbitrary object framework allows arbitrary objects to be referenced in a consistent manner regardless of the type of object. Also, the arbitrary object framework allows local arbitrary objects to either override global parent arbitrary objects or inherit capabilities and data from the global parent arbitrary object.

Arbitrary objects can execute any function that can be run or understood by the host computer system so that any underlying functionality of the operating system used by the host system can be defined as an object within the arbitrary framework. Legacy data, document objects, CPI programs, and database queries can all be encapsulated as objects within the arbitrary framework. The arbitrary object can be accessed by an arbitrary object name. Arbitrary objects are not tied to their functionality. One arbitrary object can be easily replaced with another arbitrary object of another type.

Arbitrary objects can be managed in an object library. The life cycle of the arbitrary objects may be managed in a consistent manner using revision tracking, roll-back, and sign-off. The object library can include separate specialized object libraries that can be administered separately by different developers in each area. For instance, for a web site used to generate a newspaper, there may be an advertising object library that is physically distinguished from other object libraries, such as an object library for sports or an object library for news. Therefore, queries for advertising can be created without impacting any other area of the web site.

Arbitrary objects can be deployed from the object library into a container page to generate the web site. The container page is a truly dynamic page. Unlike prior art methods, where a static copy of information is often pushed over a firewall to a live web site, the present invention incorporates object caching. An arbitrary object can be cached, rather than caching an entire page. When the arbitrary object is cached, certain elements of the arbitrary object can be specified as dynamic elements while others can be specified as static elements. Therefore, a web site can contain multiple dynamic web pages wherein objects used to construct the form, function, and content of the web page can contain dynamic elements and static elements. This provides flexibility for what needs to be computed or processed at the time that someone, such as a web user, accesses the web page.

Figure 5:
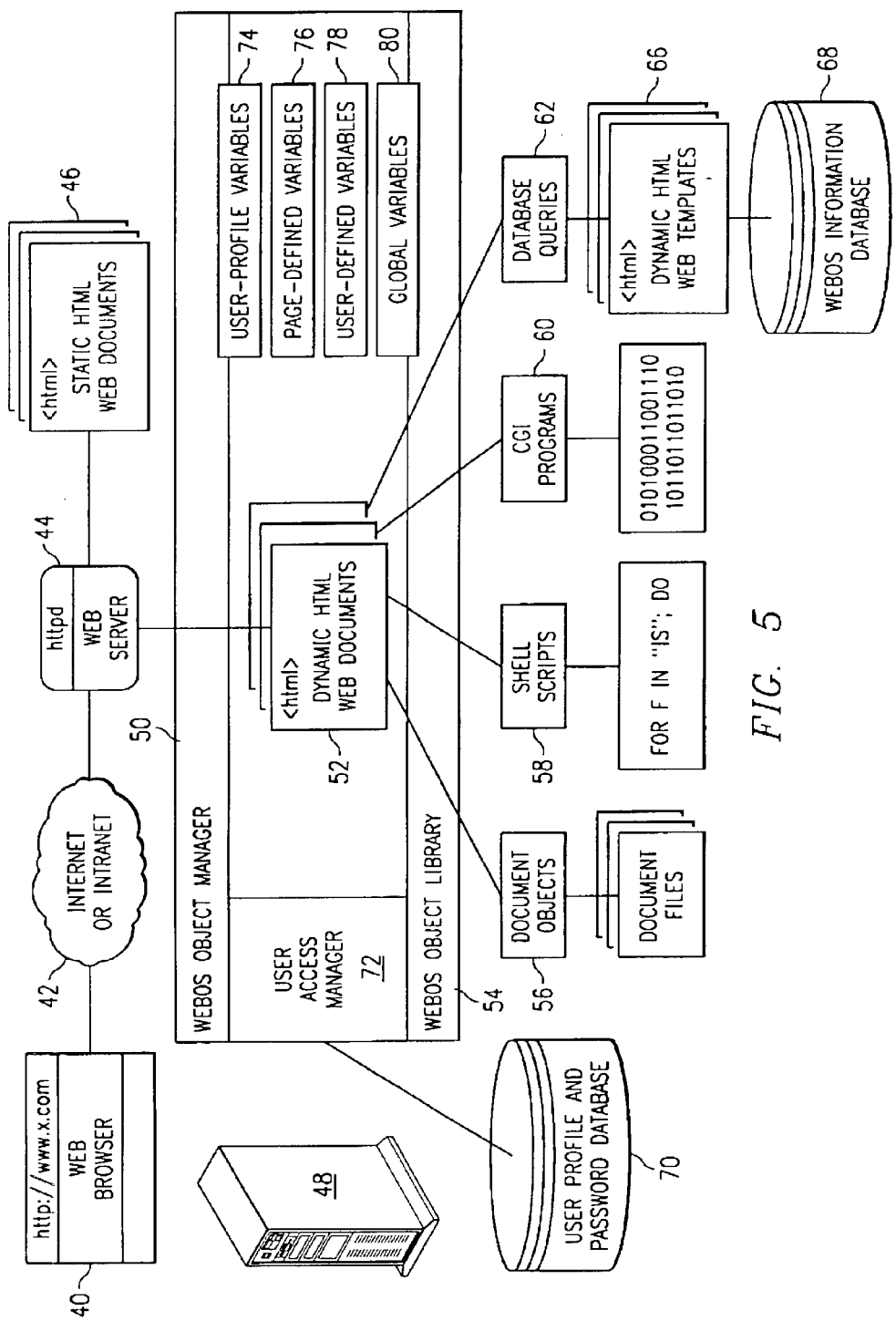
FIG. 5 is a diagram illustrating the components of one embodiment of the present invention used to generate web sites.

FIG. 5 shows the components of one embodiment of the present invention used to generate web sites. A user with web browser 40 can connect to web server 44 through internet or intranet 42. Web server 44 can access static HTML web documents 46 as well as dynamic HTML documents 52. Dynamic HTML web documents 52 can be created using Web OS Object Manager 50. Dynamic HTML Web document 52 can include document objects 56, shell scripts 58, CGI programs 60, and database queries 62. Document objects 56, shell scripts 58, CGI programs 60, and database queries 62 can be stored in WebOS object library 54. Database queries 62 can result from extracting information from WebOS Information Database 68 and inputting the information into Dynamic HTML Web Template 66.

User Profile and Password Database 70 can provide web sites or systems with a means to take advantage of customer profiles to look at customer preferences or history, and dynamically replace a website object with another object that contains content information matching the user profile or preferences. Thus, the web site or system can dynamically allocate the correct content for a customer. This is important in commerce applications. A customer's buying history can be examined for trend items and the customer presented products that match his or her profile. Present personalization systems are written purely in custom code and require an inordinately large amount of time to construct the custom applications necessary to interpret the preferences of an individual user.

The method of present invention can perform object caching. This means that an object can be cached instead of caching an entire page. Object caching permits specifying elements of an object to be dynamic and elements of the object to be static. A system user can thus have the flexibility of specifying what needs to be computed or processed at the time a user accesses the system versus trying to anticipate and calculate in advance and cache and post the object over to a server.

Many functions are stored within an object library on an arbitrary object framework such that those functions can be accessed by name arbitrarily. This is in contrast to a traditional model where the function must be explicitly invoked with all its parameters included. Objects may execute any function that can be run or understood by the host computer system so that any underlying functionality of the host's operating system can be defined as an object within the framework of the method of the present invention. The object library can contain legacy data, document objects, CTI programs, and/or database queries, that can all be encapsulated as objects within a framework and accessed from within a design. All that is needed is the name of the function in order to access the function.

Objects can be controlled to perform functions based on a profile of an individual and environmental variables, such as the type of browser, the country of the individual or the individual's IP address. A specific competitor may be blocked from seeing certain objects on a web page created using the method of the present invention.

A critical distinction between the present invention and previous object oriented development systems is the need to know how a function can be called and what to expect it to return, rather than just knowing the function's name. This means that typically the system administrator calls the name of an object and passes parameters to the object. Any and all variable information or environmental information can be available to every object. The environment space can be available to all objects executed and an object can arbitrarily take advantage of any of the environmental information, depending on the design of the object.

Different areas of a web site can be administered separately by different developers in each of these areas. An advertising object library can be physically distinguished from other object libraries, such as those for sports and news. An advertising programmer can create new queries for the advertising section of a site without having to worry about affecting other areas of the site.

The present invention allows different object types to be interchangeable. The object name is essentially just another variable in the environment. Also different variables can also be interchangeable. The object framework can be designed such that objects and variables can be kept in the same name space, every object can have access to all the environmental settings, and every object pointer can potentially be another name in the name space.

Object caching, rather than page caching can be implemented with the present invention. These objects can be stored in an object library. An object in the object library can be a file, a global variable, an executable script, a database query, a cached executable or a cached database query. This means that the results of a query can be stored in a static file using the object name as long as the static file has not expired. This is important if the query is a lengthy query.

A technical advantage of the present invention is that it allows for syndication. Syndication enables the content and function of a particular web site to be syndicated to another web site or web presentation. For instance, if a company would like to roll out a new look or syndicate its content and functionality to another business, this can be easily accomplished using the present invention. Since there is no application code resident in a web page itself, the same data can be repackaged in a number of different ways across multiple sites. There is no need to recode the design elements or design pages on the web site or recode any functions that are needed to access the content of the website. The present invention enables electronic store fronts to sell from a single source with a unique interface design. Also, newspaper chains can distribute international and national content from a single source and add local content themselves.

Another technical advantage of the present invention is that it allows for a single point of control when developing a web site. Therefore, if a large team of developers are working on a site, and multiple persons are contributing arbitrary objects to the overall arbitrary framework, then if one of the arbitrary objects has a security hole in it, the arbitrary object can be easily accessed in the object library and disabled. This security feature can immediately shut down that function across the entire web site and patch the security hole.

The present invention provides still another technical advantage in that it allows for personalization. Personalization enables companies that want to take advantage of a customer profile to look at the customer's preferences or histories and deploy information to the web site specific to the customer.

Another technical advantage of the present invention allows for profiling. Profiling enables control over the arbitrary objects presented in a web site based on a profile of the individual accessing the web site. Profiling entails determining different environmental variables such as the type of browser hitting the site, the country of the individual accessing the site, and/or the individual's IP address. This can enable a company to present specific information to the individual based on the individual's environmental variables.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method for generating a computer application on a host system in an arbitrary object framework that separates a content of said computer application, a form of said computer application and a functionality of said computer application, said method comprising:
    creating arbitrary objects with corresponding arbitrary names of various object types for generating said content of said computer application, said form of said computer application, and said functionality of said computer application;
    managing said arbitrary objects in an object library; and
    deploying said arbitrary objects from said object library into a design framework to create said computer application.

2. The method of claim 1, wherein said computer application is a web site.

3. The method of claim 1, wherein said various object types comprise text file pointers.

4. The method of claim 1, wherein said various object types comprise binary file pointers.

5. The method of claim 1, wherein said various object types comprise compiled executables.

6. The method of claim 1, wherein said various object types comprise shell commands.

7. The method of claim 1, wherein said various object types comprise remote procedure calls.

8. The method of claim 1, wherein said various object types comprise global variables.

9. The method of claim 1, wherein said various object types comprise cached executables.

10. The method of claim 1, wherein said various object types comprise cached database queries.

11. The method of claim 1, wherein said various object types comprise local variables.

12. The method of claim 1, wherein said various object types comprise local objects and global parent objects.

13. The method of claim 12, wherein said local objects can override said global parent objects.

14. The method of claim 12, wherein said local objects inherit data from said global parent objects.

15. The method of claim 12, wherein said local objects inherit capabilities from said global parent objects.

16. The method of claim 1, further comprising deploying arbitrary objects globally.

17. The method of claim 1, further comprising deploying arbitrary objects locally.

18. The method of claim 1, wherein the step of managing said arbitrary objects further comprises using revision tracking.

19. The method of claim 1, wherein the step of managing said arbitrary objects further comprises using rollback.

20. The method of claim 1, wherein the step managing further comprises using signoff.

21. The method of claim 1, wherein said arbitrary objects can be accessed and deployed into said design framework using said corresponding arbitrary names.

22. The method of claim 1, further comprising swapping an arbitrary object of one type with an arbitrary object of another type.

23. The method of claim 1, further comprising caching objects.

24. The method of claim 23, wherein the step of caching objects further comprises specifying some elements of an arbitrary object to be dynamic elements and specifying some elements of said arbitrary object to be static elements.

25. The method of claim 1, further comprising generating arbitrary objects in a programming language that is compatible or supported by said host system.

26. A method for generating a web site on a host system in an arbitrary object framework that separates a content of said web site, a form of said web site, and a functionality of said web site, said method comprising:
    creating arbitrary objects with corresponding arbitrary names of various object types for generating said content of said web site, said form of said web site, and said functionality of said web site; managing said arbitrary objects in an object library; and
    deploying said arbitrary objects from said object library to a container page to create said web site.

27. The method of claim 26, wherein said various object types comprise text file pointers.

28. The method of claim 26, wherein said various object types comprise binary file pointers.

29. The method of claim 26, wherein said various object types comprise compiled executables.

30. The method of claim 26, wherein said various object types comprise shell commands.

31. The method of claim 26, wherein said various object types comprise remote procedure calls.

32. The method of claim 26, wherein said various object types comprise global variables.

33. The method of claim 26, wherein said various object types comprise local variables.

34. The method of claim 26, wherein said various object types comprise local objects and global parent objects.

35. The method of claim 34, wherein said local objects can override said global parent objects.

36. The method of claim 34, wherein said local objects inherit data from said global parent objects.

37. The method of claim 34, wherein said local objects inherit capabilities from said global parent objects.

38. The method of claim 26, further comprising deploying arbitrary objects globally.

39. The method of claim 26, further comprising deploying arbitrary objects locally.

40. The method of claim 26, wherein the step of managing said arbitrary objects further comprises using revision tracking.

41. The method of claim 26, wherein the step of managing said arbitrary objects further comprises using rollback.

42. The method of claim 26, wherein the step managing said arbitrary objects further comprises using signoff,.

43. The method of claim 26, wherein said arbitrary objects can be accessed and deployed into said container page using said corresponding arbitrary names.

44. The method of claim 26, further comprising swapping an arbitrary object of one type with an arbitrary object of another type.

45. The method of claim 26, further comprising caching objects.

46. The method of claim 45, wherein the step of caching objects further comprises specifying some elements of an arbitrary object to be dynamic elements and specifying some elements of said arbitrary object to be static elements.

47. The method of claim 26, further comprising generating arbitrary objects in a programming language that is compatible or supported by said host system.

48. The method of claim 26, wherein said various object types comprise cached executable.

49. The method of claim 25, wherein said various object types comprise cached database queries.

50. The method of claim 26, further comprising profiling of a user accessing said web site.

51. The method of claim 26, further comprising personalization of said web site for a user accessing said web site.

52. The method of claim 26, wherein said container page comprises arbitrary objects with both dynamic and static elements.

53. The method of claim 26, wherein said content of said web site and said function of said web site can be syndicated.

\* \* \* \* \*

UNITED STATES PATENT AND TRADEMARK OFFICE
CERTIFICATE OF CORRECTION

PATENT NO.     : 6,826,744 B1
DATED          : November 30, 2004
INVENTOR(S)    : Aubrey McAuley It is certified that error appears in the above-identified patent and that said Letters Patent is hereby corrected as shown below:

Column 5,
Line 10, delete "Web OS" and insert -- WebOS --.

Column 8,
Line 61, delete "," at end of sentence.

Signed and Sealed this

Fifth Day of April, 2005

JON W. DUDAS
*Director of the United States Patent and Trademark Office*

(12) EX PARTE REEXAMINATION CERTIFICATE (9412th)
United States Patent
McAuley

(10) Number: US 6,826,744 C1
(45) Certificate Issued: Nov. 16, 2012

(54) SYSTEM AND METHOD FOR GENERATING WEB SITES IN AN ARBITRARY OBJECT FRAMEWORK

(75) Inventor: Aubrey McAuley, Austin, TX (US)

(73) Assignee: Vertical Computer Systems, Inc., Los Angeles, CA (US)

Reexamination Request:
No. 90/009,982, Jan. 6, 2012

Reexamination Certificate for:
Patent No.: 6,826,744
Issued: Nov. 30, 2004
Appl. No.: 09/410,334
Filed: Oct. 1, 1999

Certificate of Correction issued Apr. 5, 2005.

(51) Int. Cl.
*G06F 9/45* (2006.01)
*G06F 19/00* (2006.01)

(52) U.S. Cl. .................................................... 717/108
(58) Field of Classification Search ....................... None
See application file for complete search history.

(56) References Cited

To view the complete listing of prior art documents cited during the proceeding for Reexamination Control Number 90/009,982, please refer to the USPTO's public Patent Application Information Retrieval (PAIR) system under the Display References tab.

*Primary Examiner* — Salman Ahmed

(57) ABSTRACT

A system and method for generating computer applications in an arbitrary object framework. The method separates content, form, and function of the computer application so that each may be accessed or modified separately. The method includes creating arbitrary objects, managing the arbitrary objects throughout their life cycle in an object library, and deploying the arbitrary objects in a design framework for use in complex computer applications.

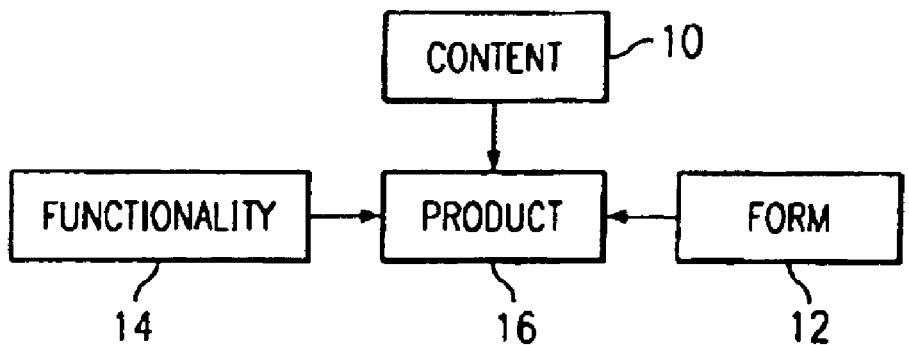

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 6, 8, 19, 22, 30, 32, 41, 44, 50 and 51 is confirmed.

Claims 1 and 26 are cancelled.

Claims 2-5, 7, 9-11, 18, 21, 23, 25, 27-29, 31, 33, 40, 45, 47-49 and 52-53 are determined to be patentable as amended.

Claims 24 and 46, dependent on an amended claim, are determined to be patentable.

New claims 54-57 are added and determined to be patentable.

Claims 12-17, 20, 34-39 and 42-43 were not reexamined.

2. The method of claim [1] *56*, wherein said computer application is a web site.

3. The method of claim [1] *56*, wherein said various object types comprise text file pointers.

4. The method of claim [1] *56*, wherein said various object types comprise binary file pointers.

5. The method of claim [1] *56*, wherein said various object types comprise compiled executables.

7. The method of claim [1] *56*, wherein said various object types comprise remote procedure calls.

9. The method of claim [1] *56*, wherein said various object types comprise cached executables.

10. The method of claim [1] *56*, wherein said various object types comprise cached database queries.

11. The method of claim [1] *56*, wherein said various object types comprise local variables.

18. The method of claim [1] *56*, wherein the step of managing said arbitrary objects further comprises using revision tracking.

21. The method of claim [1] *56*, wherein said arbitrary objects can be accessed and deployed into said design framework using said corresponding arbitrary names.

23. The method of claim [1] *56*, further comprising caching objects.

25. The method of claim [1] *56*, further comprising generating arbitrary objects in a programming language that is compatible or supported by said host system.

27. The method of claim [26] *57*, wherein said various object types comprise text file pointers.

28. The method of claim [26] *57*, wherein said various object types comprise binary file pointers.

29. The method of claim [26] *57*, wherein said various object types comprise compiled executables.

31. The method of claim [26] *57*, wherein said various object types comprise remote procedure calls.

33. The method of claim [26] *57*, wherein said various object types comprise local variables.

40. The method of claim [26] *57*, wherein the step of managing said arbitrary objects further comprises using revision tracking.

45. The method of claim [26] *57*, further comprising caching objects.

47. The method of claim [26] *57*, further comprising generating arbitrary objects in a programming language that is compatible or supported by said host system.

48. The method of claim [26] *57*, wherein said various object types comprise cached executable.

49. The method of claim [25] *57*, wherein said various object types comprise cached database queries.

52. The method of claim [26] *57*, wherein said container page comprises arbitrary objects with both dynamic and static elements.

53. The method of claim [26] *57*, wherein said content of said web site and said function of said web site can be syndicated.

*54. A method for generating a computer application on a host system in an arbitrary object framework that separates a content of said computer application, a form of said computer application and a functionality of said computer application, said method comprising:*

*creating arbitrary objects with corresponding arbitrary names of various object types for generating said content of said computer application, said form of said computer application, and said functionality of said computer application;*

*managing said arbitrary objects in an object library;*

*deploying said arbitrary objects from said object library into a design framework to create said computer application; and*

*swapping an arbitrary object of one type with an arbitrary object of another type.*

*55. A method for generating a web site on a host system in an arbitrary object framework that separates a content of said web site, a form of said web site, and a functionality of said web site, said method comprising:*

*creating arbitrary objects with corresponding arbitrary names of various object types for generating said content of said web site, said form of said web site, and said functionality of said web site;*

*managing said arbitrary objects in an object library;*

*deploying said arbitrary objects from said object library to a container page to create said web site; and*

*swapping an arbitrary object of one type with an arbitrary object of another type.*

*56. A method for generating a computer application on a host system in an arbitrary object framework that separates a content of said computer application, a form of said computer application and a functionality of said computer application, said method comprising:*

*creating arbitrary objects with corresponding arbitrary names of various object types for generating said content of said computer application, said form of said computer application, and said functionality of said computer application, said arbitrary objects being objects that can be created independently by individual preference, that are interchangeable, and that may be, but need not be, accessed solely by name, the object being an entity that can have form, content, or functionality or any combination of form, content and functionality;*

*managing said arbitrary objects in an object library; and*

*deploying said arbitrary objects from said object library into a design framework to create said computer application.*

*57. A method for generating a web site on a host system in an arbitrary object framework that separates a content of* said web site, a form of said web site, and a functionality of said web site, said method comprising:

creating arbitrary objects with corresponding arbitrary names of various object types for generating said content of said web site, said form of said web site, and said functionality of said web site, said arbitrary objects being objects that can be created independently by individual preference, that are interchangeable, and that may be, but need not be, accessed solely by name, the object being an entity that can have form, content, or functionality or any combination of form, content and functionality;

managing said arbitrary objects in an object library; and deploying said arbitrary objects from said object library to a container page to create said web site.

* * * * *